Feb. 13, 1934.  L. O. KOCH  1,946,974
CORN SHOCK SNUBBER AND LIFTER
Filed May 15, 1933  2 Sheets-Sheet 1

Inventor
L. O. Koch
By Clarence A. O'Brien
Attorney

Feb. 13, 1934.   L. O. KOCH   1,946,974
CORN SHOCK SNUBBER AND LIFTER
Filed May 15, 1933   2 Sheets-Sheet 2

Inventor
L. O. Koch
By Clarence A. O'Brien
Attorney

Patented Feb. 13, 1934

1,946,974

UNITED STATES PATENT OFFICE 1,946,974

CORN SHOCK SNUBBER AND LIFTER

Levi O. Koch, Soldiers Grove, Wis.

Application May 15, 1933. Serial No. 671,219

1 Claim. (Cl. 100—31)

The present invention relates to a corn shock snubber and lifter and has for its object the production of a device by which shocks of corn stalks and the like may be easily drawn and compressed together.

Another very important object of the invention resides in the provision of a device of this nature which is exceedingly simple in its construction, inexpensive to manufacture, thoroughly efficient and reliable in use, easy to manipulate, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

Figure 1:
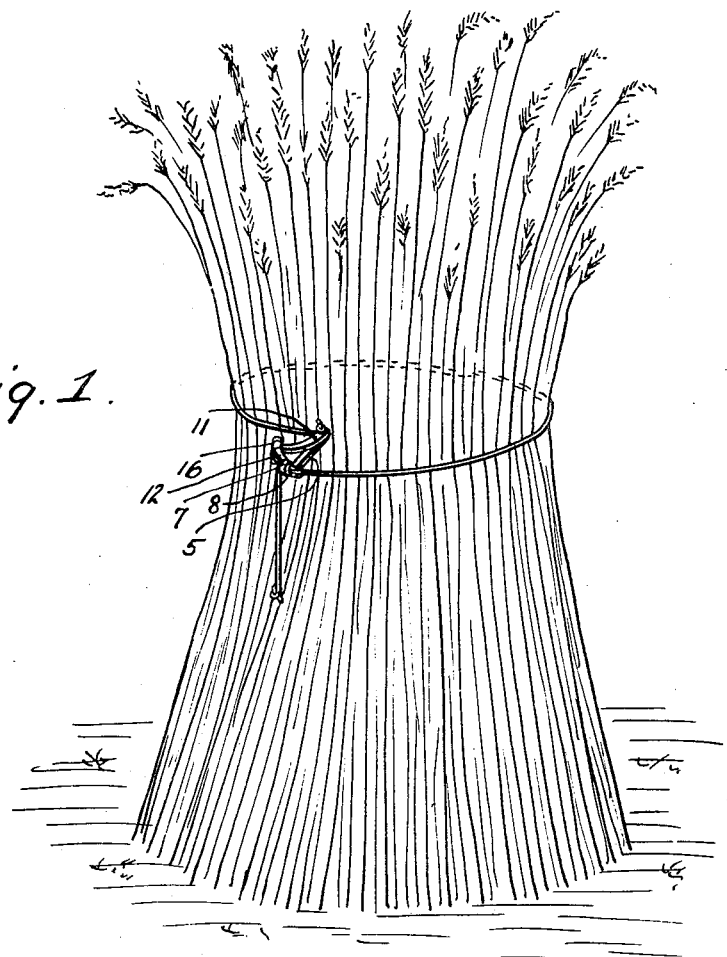
Figure 1 is a perspective view of a shock showing my device in place.
Figure 2:
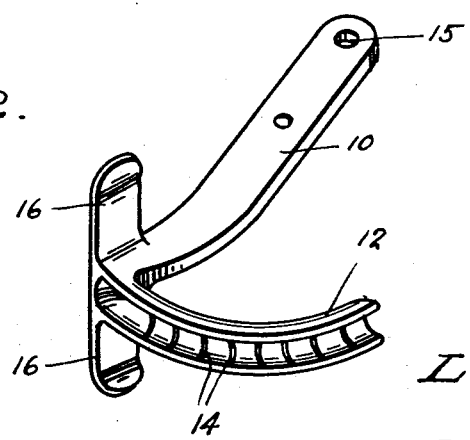
Figure 2 is a perspective view of the arm.
Figure 3:
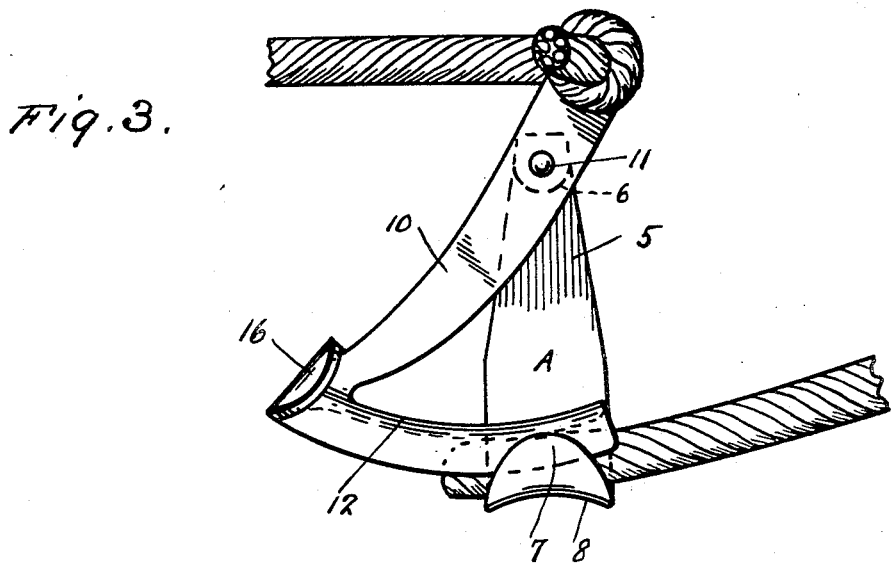
Figure 3 is a detail side elevation of the device.
Figure 4:
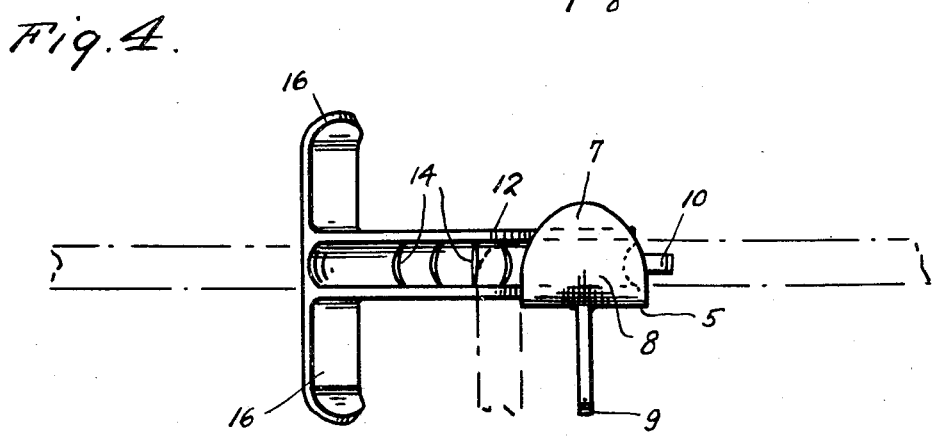
Figure 4 is a bottom plan view thereof.
Figure 5:
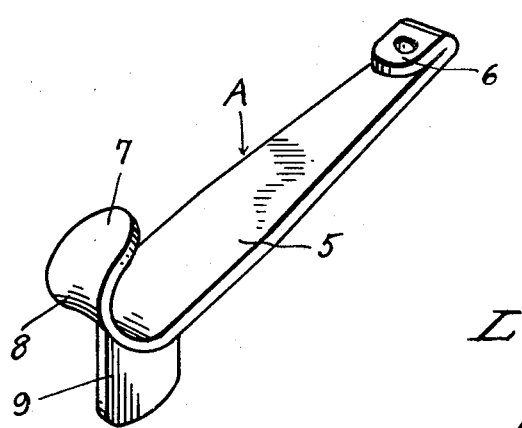
Figure 5 is a perspective view of the hook.

Referring to the drawing, in detail it will be seen that the letter A denotes a hook formed with a flat shank 5 having one end bent over upon itself in the form of an apertured lip 6 and the other end bent over upon itself to provide the lip 7 and the bight 8 joining the lip 7 with the shank is bowed upwardly as indicated to advantage in Figures 3 and 5. Extending laterally from the shank 5 adjacent said bight 8 is a handle plate 9. Numeral 10 denotes an arm an upper intermediate portion of which is rockable on the lip 6 by means of a rivet, pin or the like 11. A bowed channel extension 12 is formed on the bottom end of the arm 10 and is disposed eccentrically with relation to the pin 11 and is adapted to swing over the bight 8 for engaging the end of a rope as indicated in Figure 3 and of course the tighter the rope is pulled to the right of said figure the more the end of said rope is gripped between the extension 12 and the bight 8. The groove or channel of the extension 12 is roughened as indicated at 14 to prevent slippage of the rope engaged therein. The upper end of the arm is provided with an opening 15 so that the other end of said rope may be tied in engagement with said upper end of the arm. Handle wings 16 project from both sides of the juncture between the arm 10 and the extension 12 to assist in the releasing of the rope when desired.

In using the device, a length of rope is passed through the hole 15 in the lever 10 and tied, as shown in Figure 3, and then a part of the rope is grasped in the right hand and the rope, with the device at the free end thereof, is thrown around the shock. The device is caught in the left hand. Then the rope is placed in the hook of the member A and while the device is held in the left hand, the rope is pulled tightly around the shock with the right hand, the rope being drawn through the hook of member A. The tightening of the rope around the shock will swing the lever 10 on its pivot 11, which will cause the grooved part 12 to move over that part of the rope in the hook, so that said part of the rope is clamped in the hook by the curved part and thus the rope is held tight. An ordinary string or the like is then tied around the shock and the device, with the rope attached thereto, is removed, so that it can be used for tying another shock.

In releasing the device, the first and second fingers of the left hand are placed in engagement with the parts 16 of the lever and the thumb of the right hand is placed against the projection 9 and while the thumb of the right hand holds the member A stationary, the fingers of the left hand, exerting a pull upon the parts 16, will move the lever 10 outwardly and thus release the rope. If the device is used for lifting the entire shock onto a wagon or the like, it is first passed around the shock and then the shock lifted into the wagon and then the device can be removed and used for lifting another shock.

It is thought that the construction, operation, utility and advantages of this invention will now be quite apparent without a more detailed description thereof. The handle plate 9 primarily functions as an anchor for the hook 8 as this plate 9 will extend in between adjacent stalks of the shock.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A fodder or grain binder comprising a curved lever having an eye at one end thereof, a rope having one end fastened in the eye with the rope extending in the same direction as the curve of the lever, a cross bar having its central portion connected to the other end of the lever on the concaved edge of the lever, said bar forming a finger hold, an arcuate shaped channel member having one end connected to the last mentioned end of the lever and extending outwardly from the convex edge of the lever, said channel member having its channel opening outwardly, a pivot pin passing through the lever adjacent the eye carrying end and the channel member being eccentrically arranged to the pivot pin, a shank having one end pivoted to the pin and its other end formed with a curved hook for receiving another part of the rope, the channel-shaped member passing through the space formed by the hook for clamping the rope in the hook, and a thumb engaging projection on the hook end of the shank extending in an opposite direction from the hook, the bight part of the hook being inwardly bowed.

LEVI O. KOCH.